United States Patent [19]
Hauck et al.

[11] 3,930,022
[45] Dec. 30, 1975

[54] CERTAIN TETRAHYDRONAPHTHALENES USED IN THE TREATMENT OF CARDIAC ARRHYTHMIA

[75] Inventors: Frederic Peter Hauck, Somerville; Christopher M. Cimarusti, Hamilton, both of N.J.; Joseph E. Sundeen, Yardley, Pa.

[73] Assignee: E. R. Squibb & Sons, Inc., Princeton, N.J.

[22] Filed: June 20, 1974

[21] Appl. No.: 481,089

Related U.S. Application Data

[63] Continuation-in-part of Ser. No. 268,314, July 3, 1972, abandoned.

[52] U.S. Cl............................... 424/330; 260/574
[51] Int. Cl.²....................................... A61K 31/135
[58] Field of Search.................... 424/330; 260/574

[56] References Cited
UNITED STATES PATENTS
3,579,582  5/1971  Symon............................ 260/574

OTHER PUBLICATIONS
Chemical Abstracts, 63:8274–8276, (1965).
J. Chem. Soc., (London), pp. 288–293, (1967).

Primary Examiner—Leonard Schenkman
Attorney, Agent, or Firm—Lawrence S. Levinson; Merle J. Smith; Donald J. Barrack

[57] ABSTRACT

Tetrahydronaphthalenes having the structure

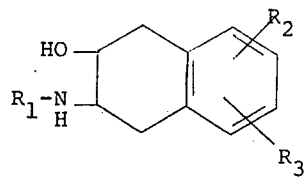

and the pharmaceutically acceptable salts thereof, are useful as beta-adrenergic receptor blocking agents in the treatment of cardiac arrhythmia. In the above formula $R_1$ can be alkyl or arylalkyl and $R_2$ and $R_3$ can each be hydrogen, hydroxyl, alkoxy, or arylalkoxy. Those compounds wherein $R_1$ is arylalkyl and at least one of $R_2$ and $R_3$ is other than hydrogen are novel, and constitute a part of this invention.

18 Claims, No Drawings

CERTAIN TETRAHYDRONAPHTHALENES USED IN THE TREATMENT OF CARDIAC ARRHYTHMIA

This application is a continuation-in-part of copending U.S. patent application Ser. No. 268,314, filed July 3, 1972 now abandoned.

BRIEF DESCRIPTION OF THE INVENTION 5,6,7,8-Tetrahydronaphthalenes having the structure

I

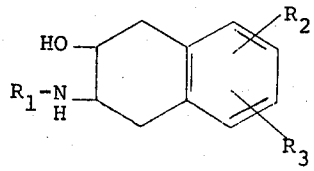

and the pharmaceutically acceptable acid-addition salts thereof, wherein the hydroxyl and amino groups are in the trans configuration, have been found to be useful beta-adrenergic receptor blocking agents.

In formula I, and throughout the specification, the symbols are as defined below:

$R_1$ can be alkyl or arylalkyl; and $R_2$ and $R_3$ can each be hydrogen, hydroxyl, alkoxy, or arylalkoxy.

The compounds of formula I, and the pharmaceutically acceptable salts thereof, wherein $R_1$ is arylalkyl and at least one of $R_2$ and $R_3$ is other than hydrogen are novel, and constitute a part of this invention.

The term "alkyl" as used throughout the specification, refers to both straight and branched chain alkyl groups having from one to eight carbon atoms, e.g., methyl, ethyl, propyl, isopropyl, t-butyl, heptyl, octyl, 2,2,4-trimethylpentyl, etc. Alkyl groups having one to four carbon atoms are preferred.

The term "alkoxy," as used throughout the specification, refers to a group of the formula alkyl—O—, wherein alkyl is as defined above.

The term "arylalkyl," as used throughout the specification, refers to an alkyl group substituted with an aryl group. The preferred arylalkyl groups are those wherein the alkyl portion of the group is methyl or ethyl. The most preferred groups are phenylmethyl and phenylethyl.

The term "arylalkoxy," as used throughout the specification, refers to an alkoxy group having the alkyl portion of the molecule substituted with an aryl group.

The term "aryl," as used throughout the specification, refers to phenyl or phenyl substituted with one or two of the following substitutents: halogens, alkyl, or alkoxy.

DETAILED DESCRIPTION OF THE INVENTION

The compounds of formula I can be prepared using as starting materials naphthalene derivatives having the structure

II

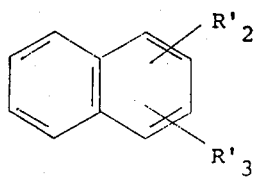

In formula II, and throughout the specification, $R'_2$ and $R'_3$ can each be hydrogen or hydroxyl. A naphthalene of formula II can be reduced with a metal such as sodium or lithium in liquid ammonia containing an alkanol such as ethanol, isopropanol, t-butanol, etc. to obtain a 5,8-dihydronaphthalene having the structure

III

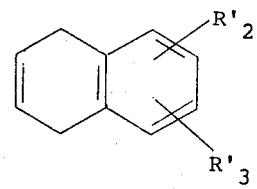

To prepare the 5,8-dihydronaphthalene materials necessary for the preparation of the compounds of formula I wherein at least one of $R_2$ and $R_3$ is alkoxy or arylalkoxy, the corresponding hydroxyl derivative of formula III is reacted with an alkyl halide or arylalkyl halide to yield a 5,8-dihydronaphthalene having the structure

IV

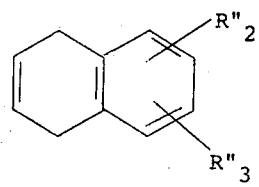

In formula IV, and throughout the specification $R''_2$ and $R''_3$ can each be hydrogen, alkoxy or arylalkoxy, at least one of $R''_2$ and $R''_3$ being other than hydrogen. The reaction is carried out in a polar organic solvent, e.g., dimethylsulfoxide, dimethylformamide, etc., in the presence of an alkali metal alkoxide, e.g., sodium methoxide, potassium ethoxide, etc.

Reaction of a 5,8-dihydronaphthalene of formula III or formula IV with m-chloroperbenzoic acid yields a 5,6,7,-8-tetrahydro-6,7-epoxynaphthalene having the structure

V

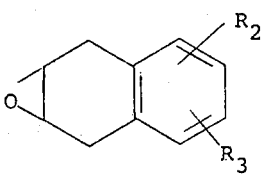

The reaction can be carried out by mixing m-chloroperbenzoic acid with a solution of a 5,8-dihydronaphthalene in an organic solvent, e.g., ethyl acetate. The resulting mixture is added to a mixture of ethyl ether and aqueous sodium bicarbonate, and mixed to form a 5,6,7,8-tetrahydro-6,7-epoxynaphthalene of formula V.

The compounds of formula I can be prepared by reacting a 5,6,7,8-tetrahydro-6,7-epoxynaphthalene of formula V with an amine having the formula VI    $R_1$—$NH_2$ 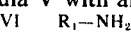

The reaction can be run in an organic solvent, e.g., ethanol, xylene, etc., at a temperature of from 50° to 140°C, preferably from 110° to 140°C. The reaction is run for about 5 hours to 24 hours, preferably 16 hours to 24 hours.

Other methods for the preparation of the compounds of formula I will be readily apparent to a person of ordinary skill in organic chemistry. The preparation of compounds of formula I containing an alkoxy group in the aromatic ring can be accomplished by first preparing the corresponding phenolic derivative. Reaction of the phenolic compound with a diazoalkane in an organic solvent yields the desired alkoxy derivative.

The compounds of formula I form acid addition salts with inorganic and organic acids. These acid addition salts frequently provide useful means for isolating the products from reaction mixtures by forming the salt in a medium in which it is insoluble. The free base may then be obtained by neutralization, e.g., with a base such as sodium hydroxide. Any other salt may then be formed from the free base and the appropriate inorganic or organic acid. Illustrative are the hydrohalides, especially the hydrochloride and hydrobromide which are preferred, sulfate, nitrate, phosphate, borate, acetate, tartrate, maleate, citrate, succinate, benzoate, ascorbate, salicylate, methanesulfonate, benzenesulfonate, toluenesulfonate and the like.

The trans-5,6,7,8-tetrahydronaphthalenes of formula I, and the pharmaceutically acceptable acid addition salts thereof, can be administered in effective amounts to mammals as antifibrillatory agents, for example, arresting cardiac arrhythmia, e.g., by inhibition of beta adrenergic receptors in the myocardium. For this purpose, a compound of formula I, or a pharmaceutically acceptable acid addition salt thereof, may be incorporated in a conventional dosage form such as tablet, capsule, elixir, injectable or the like, along with necessary carrier material, excipient, lubricant, buffer or the like. Single or divided doses of about 5 to 25 milligrams per kilogram of body weight per day, preferably about 2 to 10 milligrams per kilogram of body weight per day, two to four times daily may be administered in dosage forms as described above.

The following examples further illustrate the preparation of compounds useful in this invention.

EXAMPLE 1

6,7-trans-5,6,7,8-Tetrahydro-7(and 6)-(isopropylamino)-1,6-(and 7)-naphthalenediol, hydrochloride A. 6,7-Epoxy-5,6,7,8-tetrahydro-1-naphthol acetate A solution of 101 g of 5,8-dihydro-1-naphthol acetate in 1.5 liters of methylene chloride is cooled to 0°C and 89 g of m-chloroperbenzoic acid is added over a period of 5 minutes and the mixture is stirred overnight at room temperature.

The suspension is poured into a mixture of 500 ml of 10 percent sodium hydroxide and 1,000 g of ice. The aqueous layer is extracted with methylene chloride (two 500 ml portions), and the combined organic layers are washed with water and saturated sodium chloride solution, dried and evaporated in vacuo to give 105 g of pink solid.

B. 6,7-trans-5,6,7,8-Tetrahydro-7(and 6)-(isopropylamino)-1,6(and 7)-naphthalenediol, hydrochloride A mixture of 6,7-epoxy-5,6,7,8-tetrahydro-1-naphthol acetate (10.2 g) and isopropylamine is charged to a small bomb and heated overnight in an oil bath maintained at 100°C. After cooling, the excess amine is removed in vacuo leaving a dark brown viscous material which is chromatographed on activity 3 neutral alumina. Fractions eluted with 10–20 percent methanol in chloroform yield crystalline material on standing under hexane. Two crystallizations from ether give a sample melting at 112°–117°C. This is dissolved in isopropyl alcohol-ether and converted to the hydrochloride by adding a solution of hydrochloric acid in isopropyl alcohol. The white hydrochloride is recrystallized from isopropyl alcohol-methanol-ether to give 2.2 g of the title product, melting point 207°–210°C.

EXAMPLE 2 trans-1,2,3,4-Tetrahydro-3-[(1-methylethyl)amino]-5,8-dimethoxy-2-naphthalenol

A. 4a,5,8,8a-Tetrahydro-1,4-naphthaquinone

The 1,3-butadiene adduct of p-quinone is prepared as described by van Tamelen, et al., JACS, 91, 7315 (1969). An amount of 500 ml of liquified 1,3-butadiene is added to a mixture of 500 g of p-quinone in 3.5 liters of benzene at 0°C. The 5-liter round bottom flask is sealed with a tightly wired rubber stopper and stored in the dark at room temperature for 23 days. The mixture is treated with charcoal, filtered, and evaporated in vacuo. Recrystallization from petroleum ether (12 liters) gives 456.5 g of 4a,5,8,8a-tetrahydro-1,4-naphthaquinone, melting point 52°–57°C (literature melting point 52°–54°C).

B. 5,8-Dihydro-1,4-naphthalenediol

As described in Ber., 62, 2345 (1929) an amount of 1 ml of a saturated solution of hydrogen bromide gas in glacial acetic acid is added to a mixture of 104 g of 4a,5,8,8a-tetrahydro-1,4-naphthaquinone in 174 ml of glacial acetic acid. The solution is stirred for 5 minutes at room temperature before a vigorous exothermic reaction takes place (temperature 25°–110°C over a 2 minute period) giving a light tan solid. The solid is collected and washed with hexane to give 100.5 g of 5,8-dihydro-1,4-naphthalenediol, melting point 208°–211°C.

C. 5,8-Dihydro-1,4-dimethoxynaphthalene

A suspension of 63.18 g (0.39 mole) of 5,8-dihydro-1,4-naphthalenediol in 300 ml of absolute ethanol is heated briefly until solution is achieved. To this hot stirred solution is added alternately in five portions a solution of 40 g of sodium hydroxide in 100 ml of water, and 120 g of dimethyl sulfate. The heat evolved during the addition causes the solution to reflux. After the addition is complete a solution of 10 g of sodium hydroxide in 20 ml of water is added and the mixture is heated overnight at 75°C.

The ethanol is removed in vacuo, and the aqueous residue is thoroughly extracted with ether. The combined ether extracts are washed with saturated aqueous sodium chloride, dried, and concentrated in vacuo to give 70.40 g of tan crystals of 5,8-dihydro-1,4-dimethoxynaphthalene, melting point 48°–50°C.

D. 6,7-Epoxy-5,6,7,8-tetrahydro-1,4-dimethoxynaphthalene

To a well-stirred solution of 70.40 g of 5,8-dihydro-1,4-dimethoxynaphthalene in 1.5 liters of methylene chloride at 0°–5°C is added 81.5 g of 85 percent m-chloroperbenzoic acid over 5 minutes, and the resulting mixture is stirred overnight at room temperature. The mixture is poured into excess 10 percent aqueous sodium hydroxide (0°–5°C) and the layers are separated. The aqueous layer is washed with methylene chloride and the combined organic layers are washed with 10 percent aqueous sodium hydroxide, saturated aqueous sodium chloride, dried, and concentrated in vacuo to give a tan solid. Trituration with isopropyl ether gives 45 g of tan crystals, melting point 127°–130°C. Recrystallization from isopropyl ether gives needles of 6,7-epoxy-5,6,7,8-tetrahydro-1,4-dimethoxynaphthalene, melting point 130°–131.5°C.

E. trans-1,2,3,4-Tetrahydro-3-[(1-methylethyl)amino]-5,8-dimethoxy-2-naphthalenol A mixture of 10.3 g of 6,7-epoxy-5,6,7,8-tetrahydro-1,4-dimethoxynaphthalene in 50 ml of isopropylamine containing 2.93 of absolute ethanol is heated overnight in a small Parr bomb at 105°C ± 5°C (internal pressure = 75–100 psi). The cooled reaction mixture is concentrated in vacuo to 11.51 g of tan solid. Trituration with ether gives 10.1 g of material, melting point 141°–144°C. Two recrystallizations from ethyl acetate give 7.0 g of trans-1,2,3,4-tetrahydro-3-[(1-methylethyl)amino]-5,8-dimethoxy-2-naphthalenol, melting point 144°–145°C.

Anal. Calc'd for $C_{15}H_{23}O_3N$: C, 67.89; H, 8.74; N, 5.23. Found: C, 67.65; H, 8.98; N, 5.14.

EXAMPLE 3 trans-5,6,7,8-Tetrahydro-7(and 6)-[(1-methylethyl)amino]-1,6(and 7)-naphthalenediol A mixture of 15.3 g of 6,7-epoxy-5,6,7,8-tetrahydro-1-naphthol acetate (prepared as described in Example 1), 4.4 ml of absolute ethanol, and 75 ml of isopropylamine is heated overnight in a small Parr bomb at 125°C ± 5°C (internal pressure = 75–100 psi). The cooled reaction mixture is concentrated in vacuo to a viscous oil. This is dissolved in ether and thoroughly extracted with 5 percent hydrochloric acid. The pH of the combined acid extracts is adjusted to 7–8 with aqueous sodium hydroxide, and this is thoroughly extracted with ethyl acetate. The combined extracts are dried and concentrated in vacuo to give 16.66 g of viscous oil (contains N-isopropylacetamide). Trituration of this oil with chloroform yields 10.9 g of crude trans-5,6,7,8-tetrahydro-6-[(1-methylethyl)amino]-1,7-naphthalenediol, melting point 132°–136°C. Two recrystallizations of trans-5,6,7,8-tetrahydro-7-[(1-methylethyl)amino]-1,6-naphthalenediol from ethyl acetate yields the analytical sample (5.25 g) melting point 152°–154°C.

Two recrystallizations of crude trans-5,6,7,8-tetrahydro-6-[(1-methylethyl)amino]-1,7-naphthalenediol (2.57 g) from ethyl acetate yields the analytical sample (1.07 g), melting point 138°–140°C.

EXAMPLE 4 trans-7(and 6)-[(1,1-Dimethylethyl)amino]-5,6,7,8-tetrahydro-1,6(and 7)-naphthalenediol A mixture of 15.3 g of 6,7-epoxy-5,6,7,8-tetrahydro-1-naphthol acetate (prepared as described in Example 1), 4.4 ml of absolute ethanol, and 75 ml of t-butylamine is heated at 130°C ± 5°C in a small Parr bomb for 24 hours. The cooled reaction mixture is concentrated in vacuo to a dark viscous oil, which is taken up in ether and thoroughly extracted with 5 percent hydrochloric acid. The pH of the combined extracts is adjusted 7.0–7.5 with aqueous sodium hydroxide, and this is thoroughly extracted with ethyl acetate. The combined extracts are dried and concentrated in vacuo to yield 12.81 g of viscous oil (contains N-t-butylacetamide).

The crude oil is dissolved in benzene and applied to a column of basic alumina (400 g, Activity III). Elution with benzene and benzene/chloroform mixtures gives non-polar material, including crystalline N-t-butylacetamide. Elution with chloroform yields 3.87 g of crude trans-7-[(1,1-dimethylethyl)amino]-5,6,7,8-tetrahydro-1,6-naphthalenediol, melting point 123°–127°C, after trituration with ether. Elution with 5 percent methanol/chloroform yields 2.56 g of crude trans-6-[(1,1-dimethylethyl)amino]-5,6,7,8-tetrahydro-1,7-naphthalenediol, melting point 97°–102°C, after trituration with ether.

Two recrystallizations of crude trans-7-[(1,1-dimethylethyl)amino]-5,6,7,8-tetrahydro-1,6-naphthalenediol from ethyl acetate gives the analytical sample, melting point 126.5°–128°C.

Anal. Calc'd for $C_{14}H_{21}NO_2$: C, 71.45; H, 9.00; N, 5.95. Found: C, 71.67; H, 9.21; N, 5.90.

Two recrystallizations of crude trans-6-[(1,1-dimethylethyl)amino]-5,6,7,8-tetrahydro-1,7-naphthalenediol from benzene gives the analytical sample, melting point 152°–154°C.

Anal. Calc'd for $C_{14}H_{21}NO_2$: C, 71.45; H, 9.00; N, 5.95. Found: C, 71.71; H, 9.25; N, 5.77.

EXAMPLE 5 trans-1,2,3,4-Tetrahydro-5-methoxy-3-[(1-methylethyl)amino]-2-naphthalenol

A solution of 25 mmoles of diazomethane (prepared from 6.0 g of N-methyl-N'-nitro-N-nitrosoguanidine) in ether at 0°–5°C is added to a solution of 4.42 g of trans-5,6,7,8-tetrahydro-7-[(1-methylethyl)amino]-1,6-naphthalenediol (see Example 3) in 25 ml of methanol, and the resulting solution is left at 0°–5°C for 48 hours. The excess diazomethane is decomposed by the addition of a few drops of dilute aqueous acetic acid, and the resulting solution is concentrated in vacuo. The residue is partitioned between 5 percent aqueous sodium hydroxide and ethyl acetate, and the layers are separated. The ethyl acetate solution is washed with 5 percent aqueous sodium hydroxide, saturated aqueous sodium chloride, dried, and concentrated in vacuo to give a solid. Trituration of this with isopropyl ether gives 3.14 g of crude product, melting point 107°–110°C. Two recrystallizations from ethyl acetate give the analytical sample (1.9 g), melting point 110°–112°C.

Anal. Calc'd for $C_{14}H_{21}NO_2$: C, 71.45; H, 9.00; N, 5.95. Found: C, 71.35; H, 9.30; N, 5.99.

EXAMPLE 6 trans-1,2,3,4-Tetrahydro-3-[(1-methylethyl)amino]-2,6(and 7)-naphthalenediol

A. 1,2,3,4-Tetrahydro-2,3-epoxy-6-naphthol acetate

A solution of 15.12 g of 1,4-dihydro-6-naphthol acetate in 160 ml of dichloromethane is cooled to 0°C while 10.5 g of m-chloroperbenzoic acid is added over 10 minutes. The mixture is stirred overnight at room temperature and then poured into a slurry of 100 g of ice and 50 ml of 10 percent aqueous sodium hydroxide. The layers are separated, the aqueous layer reextracted with dichloromethane (two 100 ml portions), and the combined extracts are washed with water, dried, and evaporated in vacuo to give 16 g of the title compound as a yellow liquid.

B. trans-1,2,3,4-Tetrahydro-3-[(1-methylethyl)amino]-2,6(and 7)-naphthalenediol

A mixture of 15.3 g of 1,2,3,4-tetrahydro-2,3-epoxy-6-naphthol acetate, 4.4 ml of absolute ethanol and 75 ml of isopropylamine is heated overnight in a small Paar bomb at 130°C ± 10°C. The cooled reaction mixture is concentrated in vacuo. Trituration of this material with ether gives 11.25 g of a mixture of isomers having a melting point of 116°–150°C. The mother liquor from trituration yields an additional 0.9 g of this mixture. The mother liquor from the second trituration is concentrated in vacuo and applied to a column of basic alumina (Activity III). Elution with 5 percent methylene/chloroform gives 1.47 g of crude isomer B, melting point 125°–130°C after trituration with ether.

Three recrystallizations of the above 11.25 g mixture from ethyl acetate gives pure isomer A, melting point 153.5°–155°C.

Two recrystallizations of the 1.47 g sample of crude isomer B from ethyl acetate gives pure product, melting point 134.5°–135.5°C.

EXAMPLE 7 trans-1,2,3,4-Tetrahydro-3-[(1-methylethyl)amino]-2-naphthalenol

A. 6,7-Epoxy-5,6,7,8-tetrahydronaphthalene

A solution of 1,4-dihydronaphthalene (32.5 g) in 300 ml of chloroform is cooled in an ice bath and, while stirring, is treated portionwise with 61 g of 85 percent m-chloroperbenzoic acid. The mixture is stirred overnight at room temperature. After cooling in an ice bath, the solids are removed by filtration. The filtrate is washed twice with 5 percent potassium carbonate solution, dried over magnesium sulfate, filtered and the solvent is removed in vacuo leaving 37.7 g of yellow partially crystalline material. This is distilled from a small amount of solid potassium carbonate. After some low boiling material is removed, 16.0 g of 6,7-epoxy-5,6,7,8-tetrahydronaphthalene is collected, boiling point 95°–110°C at 0.1 mm.

B. trans-1,2,3,4-Tetrahydro-3-[(1-methylethyl)amino]-2-naphthalenol

A solution of 8 g of 6,7-epoxy-5,6,7,8-tetrahydronaphthalene in 50 ml each of isopropylamine and ethanol is heated in a Parr bomb at 130°C for 2 days. The solution is cooled and evaporated in vacuo. The residue is triturated with hexane to give 4.8 g of an off-white solid. 2.4 g of the solid is dissolved in ethyl acetate-methanol (75:25) and crystallized to give 0.40 g of white solid. The filtrate is then concentrated on the steam bath to about 15 ml, and diluted with an equal volume of hexane. It crystallizes to give 1.37 of trans-1,2,3,4-tetrahydro-3-[(1-methylethyl)amino]-2-naphthalenol, melting point, 73°–76°C.

Anal. Calc'd for $C_{13}H_{19}NO$: C, 76.05; H, 9.33; N, 6.82. Found: C, 75.85; H, 9.55; N, 6.73.

EXAMPLE 8 trans-5,6,7,8-Tetrahydro-7-(methylamino)-1,6-naphthalenediol, acetate salt (1:1)

A. trans-5,6,7,8Tetrahydro-7-[methyl(phenylmethyl)amino]-1,6-naphthalenediol

A solution of 6,7-epoxy-5,6,7,8-tetrahydro-1-naphthol acetate (15.3 g, prepared as described in Example 1) in 75ml of benzylmethylamine and 75 ml of xylene is refluxed under nitrogen for 24 hours. The xylene and most of the benzylmethylamine are removed by distillation in vacuo, yielding 42.85 g of viscous liquid. The crude product is dissolved in ether and this solution is thoroughly extracted with 5 percent hydrochloric acid (the amine salt of the product is sparingly soluble in water)*. The pH of the combined acid extracts is carefully adjusted to 7.0–7.5 by the addition of solid sodium bicarbonate. Extraction of this with ethyl acetate, followed by drying the combined extracts and concentration in vacuo gives 37 g of viscous liquid. This material is dissolved in a small amount of benzene and applied to a column of basic alumina (Activity III, 1000 g). Elution with chloroform yields 6.82 g of the title compound, melting point 151°–154°C, after trituration with isopropyl ether.

*Although this extraction procedure does remove some neutral material, it does not separate N-methyl-N-benzyl acetamide from the desired product, and may be omitted. Successful separation of the two isomeric amines is achieved by chromatographing the crude product directly.

B. trans-5,6,7,8-Tetrahydro-7-(methylamino)-1,6-naphthalenediol

A solution of trans-5,6,7,8-tetrahydro-7-[methyl(phenylmethyl)amino]-1,6-naphthalenediol (6.06 g) in 250 ml of glacial acetic acid is hydrogenated in the presence of 3.0 g of 5 percent palladium/carbon (Parr bomb; pressure = 40 – 50 psig). When the uptake of hydrogen ceases (one equivalent), the catalyst is filtered off and the filtrate concentrated in vacuo to give crystalline acetate salt.

An unsuccessful attempt is made to convert this salt to the free base as follows. The crude salt is dissolved in water, the pH adjusted to 7–8, and this solution then thoroughly extracted with ethyl acetate. Drying these extracts and concentration in vacuo yields nothing. The aqueous solution is taken to a small volume and the solid filtered. The solid is dissolved in hot ethyl acetate/ethanol, decolorized with Norite, filtered, and concentrated in vacuo to give 2.87 g of crude acetate, melting point 205°–208°C, with dec. Two recrystallizations from 95 percent ethanol give the analytical sample, (2.0 g), melting point 216°–218°C, with dec.

EXAMPLE 9 trans-7(and 6)-[[2-(3,4-Dimethoxyphenyl)ethyl]amino]-5,6,7,8-tetrahydro-1,6(and 7)-naphthalenediol A. 5,6,7,8-Tetrahydro-6,7-epoxy-1-naphthol m-Chloroperbenzoic acid (25.0 g) is added over a 10 minute period to an ice-cooled solution of 14.6 g of 5,8-dihydro-1-naphthol in 225 ml of ethyl acetate. After 16 hours at ambient temperature the slurry is poured into a cooled, stirred mixture of 300 ml each of ether and 10 percent sodium bicarbonate. After 15 minutes the organic phase is separated, washed with water, saturated salt solution and dried. Solvent removal gives an oil which is triturated with two 100 ml portions of boiling hexane. The residue is recrystallized from 150 ml of 1:1 hexane/ethyl acetate to give 6.6 g of the title compound, melting point 143°–146°C. Two further recrystallizations of a small sample give the analytical sample, melting point 149.5°–151°C.

B. trans-7(and 6)-[[2-(3,4-Dimethoxyphenyl)ethyl]amino]-5,6,7,8-tetrahydro-1,6(and 7)-naphthalenediol A solution of 5,6,7,8-tetrahydro-6,7-epoxy-1-naphthol (16.2 g) and β-(3,4-dimethoxyphenyl)ethylamine (19.93 g) in 100 ml of xylene is refluxed under nitrogen for 24 hours. The solvent is removed in vacuo to give a dark brown glass, which yields 22.65 g of solid, melting point 105°–115°C, on trituration with chloroform. On concentration of the mother liquor and re-trituration with chloroform, an additional 4.83 g of solid is obtained (total yield, 27.48 g). The two crops of solid are combined and recrystallized from ethyl acetate to give the analytical sample (15.0 g), melting point 118°–125°C.

EXAMPLE 10 trans-5,6,7,8-Tetrahydro-7-[(1-methylethyl)amino]-1,4,6-naphthalenetriol, acetate salt (1:1)

A. 4a,5,8,8a-Tetrahydro-1,4-naphthaquinone

The 1,3-butadiene adduct of p-quinone is prepared as described by van Tamelen et al., JACS, 91:7315 (1969). Liquified 1,3-butadiene is added to a mixture of p-quinone (500 g) in benzene (3.5 liters) at 0°C. the 5-liter round bottom flask is sealed with a tightly wired rubber stopper and stored in the dark at room temperature for 23 days. The mixture is treated with charcoal, filtered, and evaporated in vacuo. Recyrstallization from petroleum ether (12 liters) gives 456.5 g of product, melting point 52°–57°C (literature melting point 52°–54°C).

B. 5,8-Dihydro-1,4-diacetoxynaphthalene

A solution of 4a,5,8,8a-tetrahydro-1,4-naphthaquinone (132 g) in 480 ml of acetic anhydride is stirred at reflux overnight under a drying tube. The mixture is cooled to room temperature, allowed to stand for 1 hour, and then swirled. The product crystallizes, is filtered and washed with hexane yielding 137 g.

A second crop of product from the cooled acetic anhydride is collected and washed with hexane yielding 31.38 g.

The combined crops are dried in vacuo at 60°–80°C for 4 hours yielding 153.7 g.

See Ber. 62:2345 (1929).

C. 6,7-Epoxy-5,6,7,8-tetrahydro-1,4-diacetoxynaphthalene

To a solution of 5,8-dihydro-1,4-diacetoxynaphthalene (24.6 g) in 500 ml of methylene chloride at 0°C is added 20.2 g of 85 percent m-chloroperbenzoic acid over 5 minutes, and the resulting mixture is stirred overnight at room temperature.

The suspension is poured into excess 10 percent aqueous sodium hydroxide (0°–5°C), and the layer are separated. The aqueous layer is extracted with methylene chloride, the combined organic layers washed with water, saturated aqueous sodium chloride, dried, and concentrated in vacuo to give 23.43 g of solid. Trituration with ether gives 21.83 g of epoxide, melting point 163°–167°C. Recrystallization from ethyl acetate gives 17.56 g of product melting point 166°–168°C.

D. trans-5,6,7,8-Tetrahydro-7-[(1-methylethyl)amino]-1,4,6-naphthalenetriol, acetate salt (1:1)

A mixture of 6,7-epoxy-5,6,7,8-tetrahydro-1,4-diacetoxynaphthalene (12.23 g), 4.82 ml of isopropyl alcohol, and 75 ml of isopropylamine is heated overnight in a small Parr bomb at 115°C ± 5°. The cooled reaction mixture is concentrated in vacuo to 19.5 g of viscous oil. Attempts to crystallize the free base directly and to prepare the hydrochloride salt are unsuccessful.

The oil (18 g) is dissolved in 100 ml of glacial acetic acid, the solution concentrated in vacuo, and the residue triturated with ether to give 13.5 g of crude acetate salt, melting point 223°–227°C, dec. Two recrystallizations of 11.5 g of crude salt from ethyl acetate give 5.0 g of the title compound, melting point 225°–230°C, dec.

The beta-adrenergic receptor blocking activity of the compounds of formula I is established by assessing their ability to block the cardiovascular effects of isoproterenol hydrochloride.

The compounds are tested using the rat hepatic portal vein. The physiologic solution into which the rat hepatic portal vein is suspended is Krebs (see, Handschumacher et al., Brit. J. Pharmacol. 29:105 (1967)), aerated with 95 percent oxygen-5 percent carbon monoxide and maintained at 37°C in 10 milliliter baths.

Depending on the response of the rat tissue, the isopropterenol hydrochloride is used in a concentration of 0.01, 0.1 or 1.0 micrograms per milliliter (final bath concentration). The test compound is first used for a 2-minute period to pretreat the rat tissue; concentrations of 2 and 8 micrograms per milliliter are used. The pretreatment is followed with a 1 to 2 minute treatment of the rat tissue with 1-isoproterenol hydrochloride. If the test compound per se has a stimulant or a relaxant affect or a 50 percent or greater inhibition of the agonist is obtained, serial dilutions (1:2, 1:3 or 1:4, etc.) are then tested. Additions of materials to the baths are made in volumes of 0.05 milliliters at intervals of 5 to 7 minutes. After the compound addition, the rat tissue is washed with drug-free Krebs solution.

Muscle tension is monitored under isometric conditions (within an initial load of 2 grams) by means of Grass FT.03 force-displacement transducer; responses are amplified and recorded on a Beckman dynograph.

The test results are reported on a scale of 0 to 3. The scale has the following meanings:

| 0 | No effect or <25% | change at ≥ 8 µg/ml. |
| 1 | 25 to <50% | change at ≥ 8 µg/ml. |
| 2 | ≥ 50% | change at ≥ 8 µg/ml. |
| 3 | ≥ 50% | change at ≤ 2 µg/ml. |

The following table demonstrates the ability of the compounds indicated to block the cardiovascular effects of isoproterenol hydrochloride. This ability is rated using the 0–3 scale described above.

TABLE

| Compound | Blocking Ability |
|---|---|
| trans-1,2,3,4-tetrahydro-3-[(1-methylethyl)amino]-2-naphthalenol | 3 |
| trans-5,6,7,8-tetrahydro-6-[(1-methylethyl)amino]-1,7-naphthalenediol | 3 |
| trans-5,6,7,8-tetrahydro-7-[(1-methylethyl)amino]-1,6-naphthalenediol | 3 |
| trans-7-[(1,1-dimethylethyl)amino]-5,6,7,8-tetrahydro-1,6-naphthalenediol | 3 |
| trans-6-[(1,1-dimethylethyl)amino]-5,6,7,8-tetrahydro-1,7-naphthalenediol | 3 |
| trans-5,6,7,8-tetrahydro-7-(methylamino)-1,6-naphthalenediol, acetate salt | 2 |
| trans-1,2,3,4-tetrahydro-5-methoxy-3-[(1-methylethyl)amino]-2-naphthalenol | 3 |
| trans-1,2,3,4-tetrahydro-3-[(1-methylethyl)amino]-2,6-naphthalenediol | 3 |
| trans-1,2,3,4-tetrahydro-3-[(1-methylethyl)amino]-2,7-naphthalenediol | 3 |
| trans-5,6,7,8-tetrahydro-7-[(1-methylethyl)amino]-1,4,6-naphthalenetriol, acetate salt | 3 |

What is claimed is:

1. A method of treating cardiac arrhythmia which comprises administering to a mammalian host an effective amount of a compound having the formula

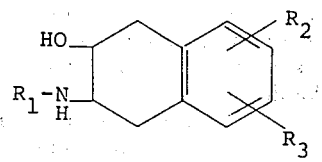

or a pharmaceutically acceptable acid addition salt thereof; wherein the hydroxyl and amino groups attached to the non-aromatic ring are in the trans configuration; wherein $R_1$ is alkyl or arylalkyl; and $R_2$ and $R_3$ are each hydrogen, hydroxyl, alkoxy or arylalkoxy; wherein aryl is phenyl or phenyl mono- or di-substituted with halogen, alkyl or alkoxy and wherein all alkyl and alkoxy groups contain one to eight carbon atoms.

2. A method of treating cardiac arrhythmia in accordance with claim 1 wherein $R_1$ is alkyl.

3. A method of treating cardiac arrhythmia in accordance with claim 1 wherein $R_1$ is arylalkyl.

4. A method of treating cardiac arrhythmia in accordance with claim 1 wherein comprises administering to a mammalian host an effective amount of 6,7-trans-5,6,7,8-tetrahydro-7-(isopropylamino)-1,6-naphthalenediol, hydrochloride.

5. A method of treating cardiac arrhythmia in accordance with claim 1 which comprises administering to a mammalian host an effective amount of 6,7-trans-5,6,7,8-tetrahydro-6-(isopropylamino)-1,7-naphthalenediol, hydrochloride.

6. A method of treating cardiac arrhythmia in accordance with claim 1 which comprises administering to a mammalian host an effective amount of trans-1,2,3,4-tetrahydro-3-[(1-methylethyl)amino]-5,8-dimethoxy-2-naphthalenol.

7. A method of treating cardiac arrhythmia in accordance with claim 1 which comprises administering to a mammalian host an effective amount of trans-5,6,7,8-tetrahydro-7-[(1-methylethyl)amino]-1,6-naphthalenediol.

8. A method of treating cardiac arrhythmia in accordance with claim 1 which comprises administering to a mammalian host an effective amount of trans-5,6,7,8-tetrahydro-6-[(1-methylethyl)amino]-1,7-naphthalenediol.

9. A method of treating cardiac arrhythmia in accordance with claim 1 which comprises administering to a mammalian host an effective amount of trans-7-[(1,1-dimethylethyl)amino]-5,6,7,8-tetrahydro-1,6-naphthalenediol.

10. A method of treating cardiac arrhythmia in accordance with claim 1 which comprises administering to a mammalian host an effective amount of trans-6-[(1,1-dimethylethyl)amino]-5,6,7,8-tetrahydro-1,7-naphthalenediol.

11. A method of treating cardiac arrhythmia in accordance with claim 1 which comprises administering to a mammalian host an effective amount of trans-1,2,3,4-tetrahydro-5-methoxy-3-[(1-methylethyl)amino]-2-naphthalenol.

12. A method of treating cardiac arrhythmia in accordance with claim 1 which comprises administering to a mammalian host an effective amount of trans-1,2,3,4-tetrahydro-3-[(1-methylethyl)amino]-2,6-naphthalenediol.

13. A method of treating cardiac arrhythmia in accordance with claim 1 which comprises administering to a mammalian host an effective amount of trans-1,2,3,4-tetrahydro-3-](1-methylethyl)amino]-2,7-naphthalenediol.

14. A method of treating cardiac arrhythmia in accordance with claim 1 which comprises administering to a mammalian host an effective amount of trans-1,2,3,4-tetrahydro-3-](1-methylethyl)amino]-2-naphthalenol.

15. A method of treating cardiac arrhythmia in accordance with claim 1 which comprises administering to a mammalian host an effective amount of trans-5,6,7,8-tetrahydro-7-(methylamino)-1,6-naphthalenediol, acetate salt.

16. A method of treating cardiac arrhythmia in accordance with claim 1 which comprises administering to a mammalian host an effective amount of trans-7-[[2-(3,4-dimethoxyphenyl)ethyl]amino]-5,6,7,8-tetrahydro-1,6-naphthalenediol.

17. A method of treating cardiac arrhythmia in accordance with claim 1 which comprises administering to a mammalian host an effective amount of trans-6-[[2-(3,4-dimethoxyphenyl)ethyl]amino]-5,6,7,8-tetrahydro-1,7-naphthalenediol.

18. A method of treating cardiac arrhythmia in accordance with claim 1 which comprises administering to a mammalian host an effective amount of trans-5,6,7,8-tetrahydro-7-](1-methylethyl)amino]-1,4,6-naphthalenetriol, acetate salt.

* * * * *